United States Patent [19]

Chene

[11] Patent Number: 5,285,694
[45] Date of Patent: Feb. 15, 1994

[54] SHIFT PLATE ACTUATED SINGLE SHAFT SHIFTING MECHANISM

[75] Inventor: William R. Chene, Kalamazoo, Mich.
[73] Assignee: Eaton Corporation, Cleveland, Ohio
[21] Appl. No.: 977,928
[22] Filed: Nov. 18, 1992
[51] Int. Cl.$^5$ .............................................. G05G 5/10
[52] U.S. Cl. .................................... 74/477; 74/335; 74/473 R
[58] Field of Search ................ 74/335, 473 R, 475, 74/477

[56] References Cited

U.S. PATENT DOCUMENTS

| | | | |
|---|---|---|---|
| 1,727,646 | 9/1929 | Hunt et al. | 74/477 |
| 2,098,708 | 11/1937 | Maker et al. | 74/473 R |
| 4,132,125 | 1/1979 | Janiszewski | 74/477 |
| 4,275,612 | 6/1981 | Silvester | 74/473 R |
| 4,290,515 | 9/1981 | Bogema et al. | 192/53 C |
| 4,438,657 | 3/1984 | Nobis | 74/477 |
| 4,445,393 | 5/1984 | Braun | 74/346 |
| 4,503,727 | 3/1985 | Ballendux | 74/477 |
| 4,507,981 | 4/1985 | Hiraiwa et al. | 74/477 |
| 4,584,895 | 4/1986 | Holmes | 74/476 |
| 4,621,537 | 11/1986 | Piazza et al. | 74/477 |
| 4,722,237 | 2/1988 | McNinch, Jr. | 74/346 |
| 4,920,815 | 5/1990 | Reynolds | 74/473 R X |
| 5,085,095 | 2/1992 | Lasoen | 74/473 R |
| 5,101,680 | 4/1992 | Parsons | 74/475 |

FOREIGN PATENT DOCUMENTS 3-528  1/1991  Japan ..................... 74/477

Primary Examiner—Leslie A. Braun
Assistant Examiner—William O. Trousdell
Attorney, Agent, or Firm—Brooks & Kushman

[57] ABSTRACT

An apparatus for selection and engagement of selectable gear ratios in a change speed transmission is disclosed. The apparatus comprises a shaft mounted in a housing, a plurality of shift forks, and a shift plate. Each of the shift forks is axially movable along the shaft. Each of the shift forks also has a projection extending therefrom. The shift plate has a plurality of first patterns therethrough. Each first pattern includes axial and transverse pathways arranged to receive a corresponding projection such that when one of the projections is not aligned in an axial pathway of one of the first patterns in response to lateral movement of a shifting actuator, the other projections are aligned in axial pathways similarly located in the other first patterns. Subsequent axial movement of the shifting actuator imparts movement to only one shift fork to engage the desired gear.

14 Claims, 3 Drawing Sheets

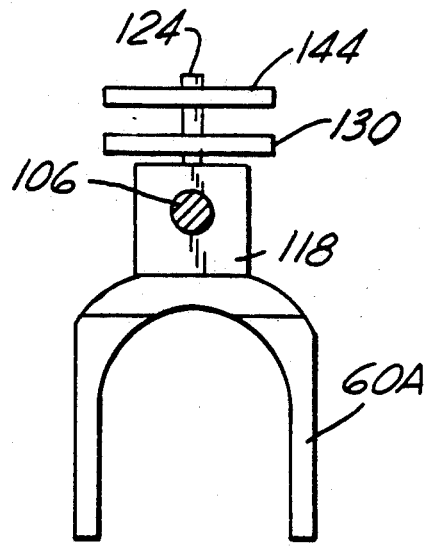
fig-7
fig-5
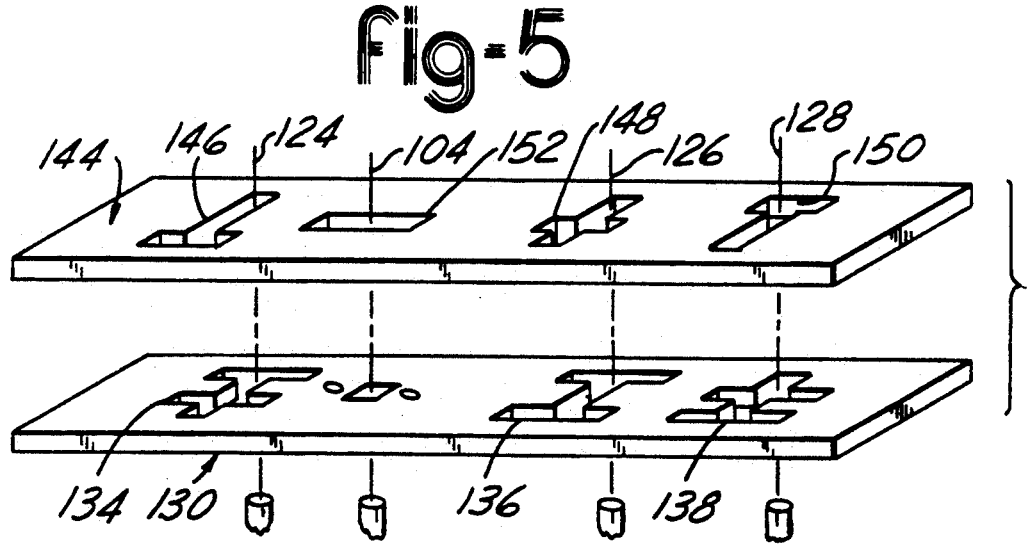
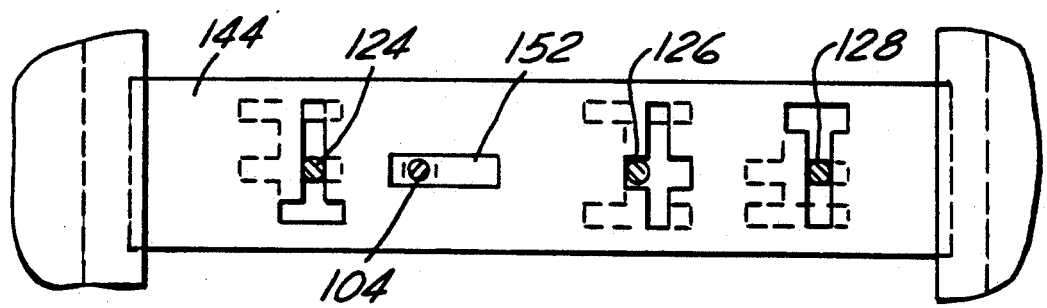
fig-6

1

SHIFT PLATE ACTUATED SINGLE SHAFT SHIFTING MECHANISM

TECHNICAL FIELD

The present invention relates to a shifting mechanism for a change gear transmission, or the main transmission section of a compound transmission, of the type wherein selected gear ratios are engaged and disengaged by axially movable gears and/or gear engaging jaw clutch members. In particular, the present invention relates to shifting mechanism of the type described utilizing a single shift shaft for the selective engagement of three or more gear ratios selectively engageable one at a time.

BACKGROUND ART

Single shaft shifting mechanisms for selecting and engaging the selectable ratios of a multiple speed vehicular mechanical transmission re known in the prior art as may be seen by reference to U.S. Pat. No. 4,621,537 and German Patent No. 1011736, the disclosures of which are hereby incorporated by reference. Such mechanisms are, in certain situations, improvements relative to the multiple parallel shift rail type devices as disclosed in U.S. Pat. Nos. 4,445,393; 4,275,612; 4,584,895 and 4,722,237, the disclosures of which are hereby incorporated by reference, as they require fewer parts, utilize a single moving shaft making the use of improved bearings and finishes more economically feasible, require less space, allow easier control of an auxiliary transmission and/or allow easier more economical sensing of transmission neutral and transmission in-gear conditions.

While the prior art single shaft shifting mechanisms were useful in certain situations, they were not totally satisfactory as the hub or block portions of the various shift forks required multiple axially extending slots cut radially through the hub from the inner diameter to the outer diameter surfaces thereof which could weaken the hubs and which were somewhat difficult and expensive to produce.

Further, the prior art single shaft shifting mechanisms utilized rather complicated cross-shaft mechanisms which included the various detent and stop mechanisms and thus did not allow for easy conversion of the transmission for both direct and remote shifting configurations.

U.S. Pat. No. 4,920,815 to Reynolds, assigned to the assignee of the present invention, addresses these shortcomings in the prior art. Reynolds discloses a single shaft shifting mechanism having two shift keys for contact with hubs and movement of shift forks. While Reynolds is a perfectly acceptable solution to these problems, it would be advantageous to reduce the costs and part complexity required in that design.

SUMMARY OF THE INVENTION

The present invention is an improved apparatus for selection and engagement of selectable gear ratios in a change speed transmission. The apparatus comprises a shaft mounted in a housing, a plurality of shift forks, and a shift plate. Each of the shift forks is axially movable along the shaft. Each of the shift forks also has a projection extending therefrom. The shift plate has a plurality of first patterns therethrough. Each first pattern includes axial and transverse pathways arranged to receive a corresponding projection such that when one of the projections is not aligned in an axial pathway of one of the first patterns, the other projections are aligned in axial pathways similarly located in the other first patterns. Subsequent axial movement of a shifting actuator imparts movement to only one shift fork to engage the desired gear.

Accordingly, it is an object of the present invention to provide a new and improved single shaft shifting mechanism.

Another object of the present invention is to provide a mechanism of the type described above in which the costs and part complexity are less than the prior art devices.

These and other objects and advantages of the present invention will become apparent from a reading of the detailed description of the preferred embodiment in connection with the drawings.

BRIEF DESCRIPTION OF THE DRAWINGS

FIG. 5 is an exploded perspective view of an interlock plate and a shift plate of the present invention;

FIG. 6 is a top view of the superimposed interlock plate and shift plate; and

FIG. 7 is a partial cross-sectional view taken along lines 7—7 in FIG. 2.

DESCRIPTION OF THE PREFERRED EMBODIMENT

Figure 1:
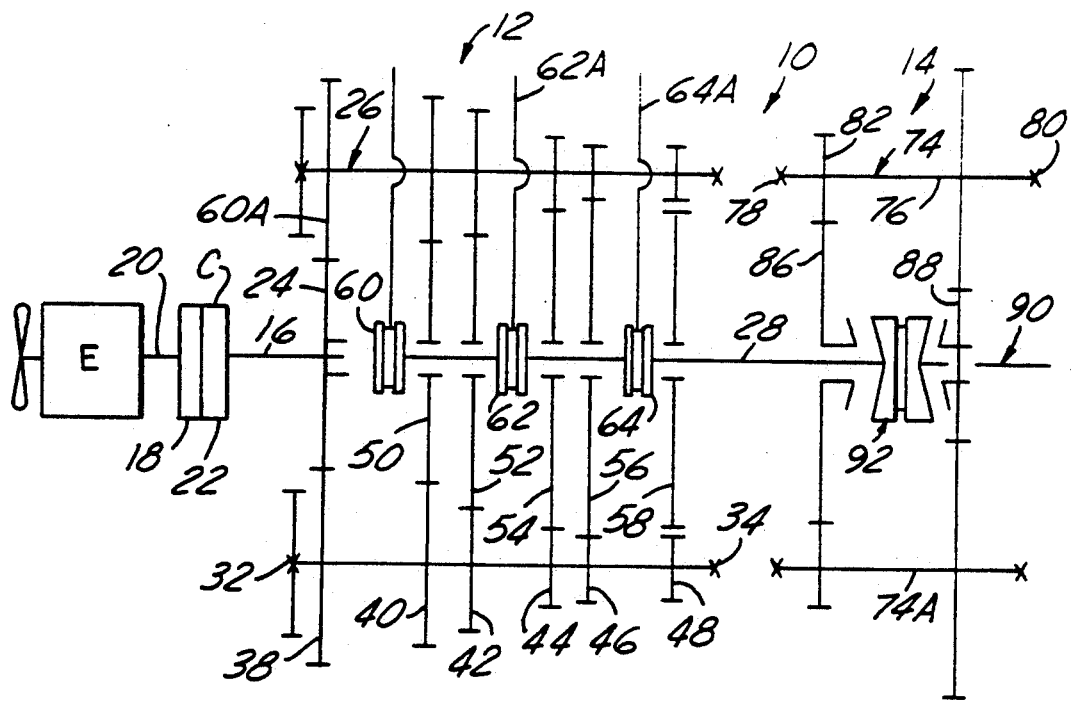
FIG 1 is a schematic illustration of a compound transmission having a range type auxiliary section.

Certain terminology will be used in the following description for convenience in reference only and will not be limiting. The words "upwardly", "downwardly", "rightardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change ear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate and substantially synchronous speed.

The term transmission as used herein shall refer to either a simple transmission or to the main transmission section of a compound transmission.

Figure 1A:
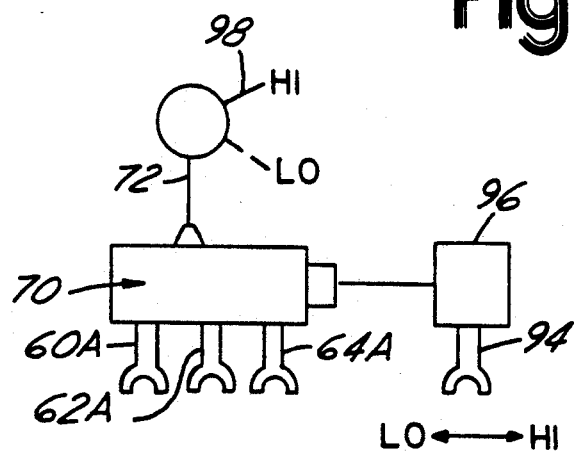
FIG. 1A is a schematic illustration of the transmission or FIG. 1.
Figure 1B:
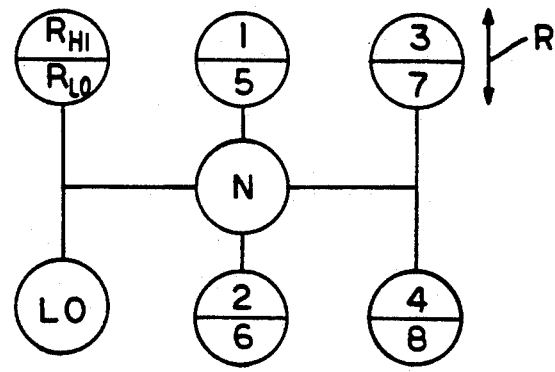
FIG. 1B is a schematic illustration of the shift pattern of FIG. i.

Referring to FIGS. 1, 1A and 1B, a range type compound transmission 10 with which the shifting mechanism of the present invention is advantageously utilized is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift yokes or forks 60A, 62A and 64A, respectively, associated with the shift housing assembly 70, as well known in the prior art. Clutch collars 60, 62 and 64 may be of the well known acting synchronized or nonsynchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork 94 and the range section shifting actuator assembly 96, is provided for clutching either gear 86 to mainshaft 28 for low range operation or gear 88 to mainshaft 28 for direct or high range operation of the compound transmission 10. The shift pattern for compound range type transmission 10 is schematically illustrated in FIG. 1B. Selection of low or high range operation of the transmission 10 is by means of an operator actuated switch or button 98 which is usually located at the shift lever 72. Alternatively, a "double H" type auxiliary shifting device may be utilized.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single counter-shift type.

Figure 2:
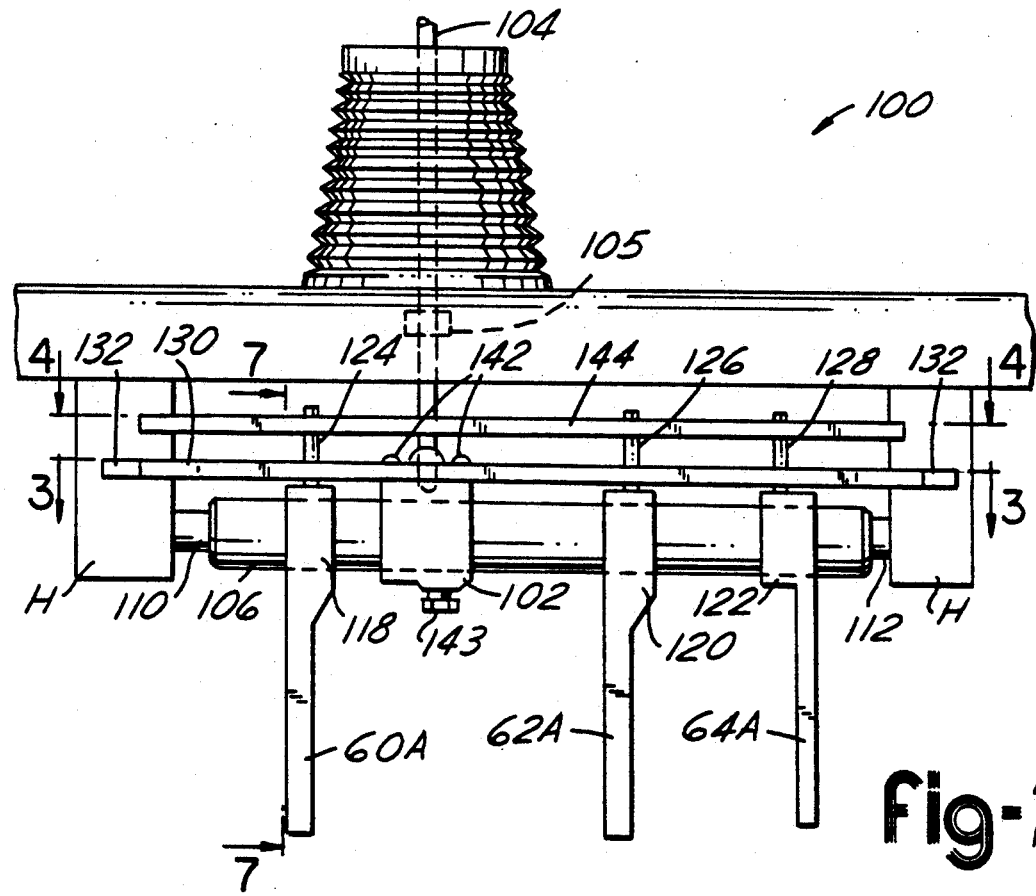
FIG. 2 is a side view of the single shaft shifting mechanism of the present invention.
Figure 4:
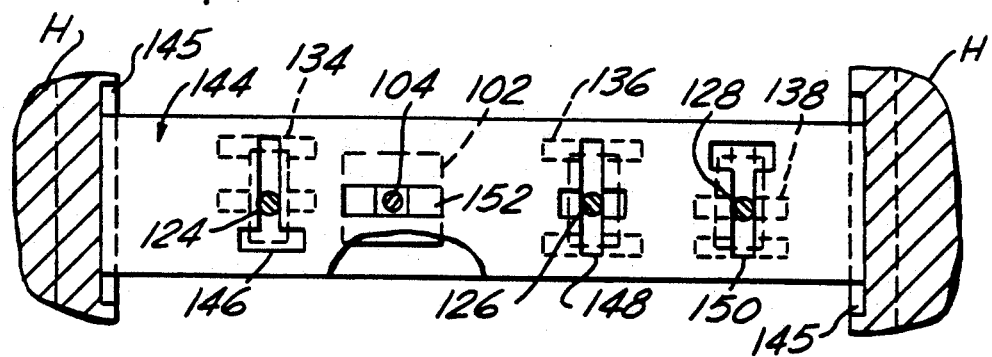
FIG. 4 is a partial cross-sectional view of the shifting of the present invention taken along line 4—4 in FIG. 2.
Figure 3:
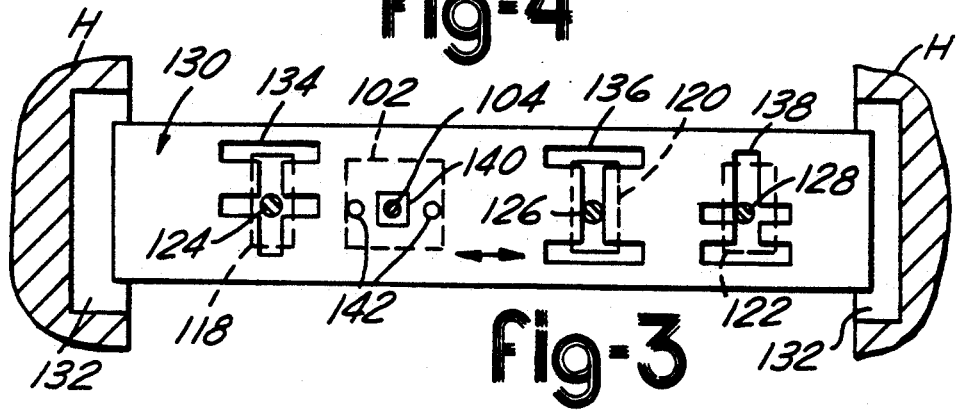
FIG. 3 is a partial cross-sectional view of the shifting of the present invention taken along line 3—3 in FIG. 2.

FIGS. 2-4 show the single shaft shifting mechanism 100 of the present invention in greater detail. The shifting mechanism 100 includes a block member 102 defining a simple socket for forming a ball and socket type connection with either a direct shifting actuator 104 or remote shifting actuator (not shown). Direct shift actuators, such as shift lever/tower mechanisms utilized with conventional trucks and tractors, and remote shifting actuators of the type utilized with cab-over-engine trucks and tractors are both well known as may be been by reference to U.S. Pat. Nos. 3,799,002; 3,934,485; 4,290,515; 4,275,612 and 4,543,843, the disclosures of Which are hereby incorporated by reference. The actuator 104 is universally pivotable through mounting 105, such that movement by the operator of the top end of the actuator 104 in a certain direction results in movement in the opposite direction by the lower end of the actuator 104.

The shifting mechanism 100 of the present invention is designed for use on a vehicular transmission, such as transmission 10, comprising a number of selectively engageable gear ratios, each designed to be engaged by axial movement of a clutch member into engagement with a corresponding jaw clutch member by means of shift forks, such as shift forks 60A, 62A, and 64A. The shift forks are effective to axially position a selective one of the clutch collars in opposite axial directions from the centered nonengaged positions thereof as illustrated in FIG. 1.

The shifting mechanism 100 includes a shaft 106 with reduced diameter portions 110 and 112 mounted in the housing H such as by needle bearings, bushings, or a press or slip fit. Shaft 106 supports the three shift forks 60A, 62A and 64A. Each of the shift forks includes a hub like portion 118, 120, and 122, each of which is in turn provided With a throughbore through which the shaft 106 is received such that each shift fork is axially movable along the shaft 106. Each of the hub portions 118, 120 and 122 of the shift forks is provided with a dog or projection 124, 126 and 128, respectively, extending radially and generally upwardly therefrom. The projections preferably all extend in the same direction, namely vertically.

The shifting mechanism 100 also includes a shift plate 130 which is axially and laterally movable relative to shaft 106 in slots 132 in the housing H. The shift plate 130 has a plurality of first patterns 134, 136 and 138 therethrough. Each of the first patterns includes axial and transverse pathways which are preferably formed when the shift plate 130 is stamped. The middle first pattern 136, for example, is formed in a generally "H" shape. The axial and transverse pathways are arranged to receive one of the corresponding projections 124, 126 or 128. The shifting actuator 104 extends through aperture 140 in the shift plate 130 and is received in the socket connector of block member 102, which is attached to the shift plate 130 by fasteners 142.

The shifting mechanism 100 also includes an interlock plate 144 disposed in the housing H generally above the shift plate 130. The interlock plate 144 is laterally movable relative to the shaft 106 in slots 145 in the housing H, but is axially fixed relative to shaft 106. The interlock plate 144 has a plurality of second patterns 146, 148 and 150 therethrough similar to the first patterns of the shift plate 130. Like the first patterns 134, 136 and 138, each second pattern includes axial and transverse pathways arranged to receive one of the corresponding projections 124, 126 or 128.

The shift plate 130 is laterally and axially movable in response to movement of the actuator 104. The interlock plate 144 is only laterally movable in response to movement of the actuator 104. Thus, the first and second patterns move relative to the projections 124, 126 and 128. The geometry of the first patterns 134, 136 and 138 is such that when one of the projections is not aligned for axial movement in an axial pathway of one of the first patterns, the other projections are aligned in axial pathways similarly located in the other first patterns. The geometry of the second patterns is different, however, in that when one of the projections is axially aligned with its corresponding axial pathway, the axial pathways similarly located in the other two second patterns are not aligned with their corresponding projection. Because at any given point, two projections are axially movable within their axial pathways in the shift plate 130, axial movement of the shift plate imparts movement to only one shift fork.

By way of example, assume the operator has rotationally positioned actuator 104 for selection of engagement or disengagement of either low or reverse speed gear ratios. The actuator 104 will position the shift plate 130 and the interlock plate 144 in relation to the projections 124, 126 and 128 as schematically illustrated in FIG. 5. In this position, the projections 124 and 126 are in axial alignment with the uppermost axial pathways of the patterns 134 and 136, but there exists no upper axial pathway in the pattern 138. When the operator thereafter moves the actuator 104 forwardly or rearwardly and thereby moves the shift plate 130 in the opposite direction, the projections 124 and 126 are free to slide in their corresponding axial pathways, and thus no force is exerted on the shift forks 60A and 62A to which the projections 124 and 126 are respectively mounted. By contrast, the axial movement of the shift plate 130 imparts force to the projection 128, thereby causing the shift fork 64A to move axially on the shaft 106 for engagement or disengagement of either gear 56 or 58 to main shaft 28. During this process, the actuator 104 moves axially in an aperture 152 in the interlock plate 144. Projections 124 and 126 are not in alignment with axial pathways of the second patterns 146 and 148, and thus the shift forks 60A and 62A are thereby locked against axial movement on the shaft 106. Projection 128 is in alignment with the upper axial pathway of the second pattern 150, and therefore the projection 128 and the shift fork 64A to which it is connected are not prevented from moving axially.

In a similar manner, selecting engagement or disengagement of first or second speed ratios results in locking out hub portions 118 and 122 of shift forks 60A and 64A while axially drawing hub portion 120 of shift fork 62A on the shaft 106. FIG. 6 shows the relative positions of the actuator 104, and of the projections 124, 126 and 128 in the patterns of the plates 130 and 144, upon forward movement of the shift plate 130 when the second speed ratio is chosen. Also, selecting engagement or disengagement of third or fourth ratios will result in locking the hub portions 120 and 122 of shift forks 62A and 64A while drawing the hub portion 118 of shift fork 60A axially along the shaft 106.

FIG. 7 shows the hub portion 118 of shift fork 60A provided with projection 124. Preferably, the projection 124 is cast as part of the fork 60A. The profile of the projection 124 may vary with its radial distance from the hub 118, but in any event, the projection 124 is of such a length as to extend through the patterns in both the shift plate 130 and the interlock plate 144. The shift plate 130 and the interlock plate 144 are shown generally planar and parallel, but it should be understood that one or both of the plates can be bent or curved slightly along its axial dimension.

While the single shaft shifting mechanism of the present invention is illustrated in connection with a five forward speed one reverse speed main transmission section 12, such mechanisms could also be utilized with transmissions having a greater number of selectable ratios by the provision of additional shift fork and hub assemblies and proper design of corresponding patterns in the shift and interlock plates.

As disclosed in U.S. Pat. No. 4,920,815 to Reynolds, assigned to the assignee of the present invention and hereby incorporated by reference, the shifting mechanism 100 can also be provided with a spring biased plunger member to provide the operator with a positive indication of having properly positioned the actuator 104 for selection of certain speed gear ratios. Further, the plunger may provide the well known resistance to selection of low and reverse speed and will tend to force the transmission out of such a selection position upon release of the shift lever.

The shifting mechanism 100 of the present invention may also include various additional sensors or sensor actuating structures for cooperation with sensing devices provided in the housing as is well known in the prior art. For example, reduced diameter portion 112 of shaft 106 may include a first ramped notch designed to interact with a plunger provided in the housing H to actuate a neutral start safety switch. Reduced diameter portion 112 may include a second ramped notch for cooperation with another plunger provided in housing H for the operation of an auxiliary transmission shifting control valve. Hub portion 122 of shift fork 64A may include a projection for operation of a reverse of backing light switch. Hub portion 118 of shift fork 60A may include a protrusion which will engage a sensor when the shift fork is moved for engagement of the high speed for operation of a road speed governor valve or the like.

As indicated in U.S. Pat. No. 4,920,815 to Reynolds, the various in gear, in neutral detent mechanisms, the various stop mechanisms and the mechanisms for indicating that the actuator 104 has been rotated into the various rotational selection positions thereof can all be integral with the mechanism 100 allowing the mechanism 100 to be utilized with any standard shift actuator adapted to be received in the socket of block member 102 without requiring any special modifications of the shift actuator mechanism.

Although the present invention has been set forth with a certain degree of particularity, it is understood that various modifications are possible without departing from the spirit and the scope of the invention as hereinafter claimed.

What is claimed is:

1. Apparatus for selection and engagement of selectable gear ratios in a change speed transmission, the apparatus comprising:
   a shaft defining an axis;
   a plurality of shift forks, each shift fork being axially movable along the shaft and having a projection extending from the shift fork;
   a shift plate having a plurality of first patterns therethrough, each first pattern including pathways arranged axially and transversely to receive a corresponding projection such that when one of the projections is not aligned in an axial pathway of one of the first patterns, the other projections are aligned in axial pathways in the other first patterns;
   an interlock plate having a plurality of second patterns therethrough, each second pattern including pathways arranged axially and transversely to receive a corresponding projection such that when one of the projections is aligned in an axial pathway of one of the second patterns, the other projections are not aligned in axial pathways in the other second patterns; and
   a housing having a slot in which the interlock plate is mounted to fix the interlock plate against axial movement relative to the shaft.

2. The apparatus of claim 1 wherein the shift plate and the interlock plate are generally planar.

3. The apparatus of claim 2 wherein the shift plate is generally parallel to the interlock plate.

4. The apparatus of claim 1 wherein each shift fork includes a hub portion.

5. The apparatus of claim 4 wherein the projections extend from the hub portions.

6. The apparatus of claim 1 wherein the projections extend generally vertically from the shift forks.

7. The apparatus of claim 1 further comprising a block member axially movable on the shaft, the block member defining a socket type cavity for receipt of a shift actuator for imparting movement to the shift plate.

8. The apparatus of claim 1 wherein the plurality of first patterns comprises three first patterns.

9. The apparatus of claim 8 wherein the first patterns lie generally in a row.

10. The apparatus of claim 1 wherein the plurality of second patterns comprises three second patterns.

11. The apparatus of claim 10 wherein the second patterns lie generally in a row.

12. The apparatus of claim 1 wherein the change speed transmission provides five forward selectable gear ratios.

13. The apparatus of claim 1 wherein the change speed transmission provides one reverse selectable ratio.

14. Apparatus for selection and engagement of selectable gear ratios in a change speed transmission, the apparatus comprising:
   a housing;
   a shaft mounted in the housing and defining an axis;
   a plurality of shift forks, each shift fork being axially movable along the shaft and having a projection extending generally vertically from the shift fork;
   a shift plate having a plurality of first patterns therethrough, each first pattern including pathways arranged axially and transversely to receive a corresponding projection such that when one of the projections is not aligned in an axial pathway of one of the first patterns, the other projections are aligned in axial pathways in the other first patterns;
   an interlock plate having a plurality of second patterns therethrough, each second pattern including pathways arranged axially and transversely to receive a corresponding projection such that when one of the projections is aligned in an axial pathway of one of the second patterns, the other projections are not aligned in axial pathways in the other second patterns; and
   a block member axially movable on the shaft, the block member receiving a shift actuator adapted to impart movement to the shift plate;
   the housing having a slot in which the interlock plate is mounted to fix the interlock plate against axial movement relative to the shaft.

* * * * *

UNITED STATES PATENT AND TRADEMARK OFFICE
CERTIFICATE OF CORRECTION

PATENT NO. : 5,285,694
DATED : February 15, 1994
INVENTOR(S) : William R. Chene

It is certified that error appears in the above-identified patent and that said Letters Patent is hereby corrected as shown below:

Column 2, line 25, replace "Figure i" with --Figure 1--;

Column 2, line 29, replace "shifting" with --shifting mechanism--;

Column 2, line 31, replace "shifting" with --shifting mechanism--;

Column 2, line 58, replace "ear" with --gear--;

Column 4, line 54, replace "Which" with --which--.

Signed and Sealed this

Thirteenth Day of September, 1994

Attest:

BRUCE LEHMAN

*Attesting Officer*   *Commissioner of Patents and Trademarks*